United States Patent [19]

Hamakawa et al.

[11] Patent Number: 5,126,907
[45] Date of Patent: Jun. 30, 1992

[54] THIN FILM MAGNETIC HEAD HAVING AT LEAST ONE MAGNETIC CORE MEMBER MADE AT LEAST PARTLY OF A MATERIAL HAVING A HIGH SATURATION MAGNETIC FLUX DENSITY

[75] Inventors: Yoshihiro Hamakawa, Koganei; Isamu Yuito, Ome; Hisashi Takano, Hachioji; Naoki Koyama, Kokubunji; Eijin Moriwaki; Shinobu Sasaki, both of Hachioji; Kazuo Shiiki, Kanagawa, all of Japan

[73] Assignee: Hitachi, Ltd., Tokyo, Japan

[21] Appl. No.: 525,666

[22] Filed: May 21, 1990

[30] Foreign Application Priority Data

May 24, 1989 [JP] Japan .................................. 1-128818
Jun. 26, 1989 [JP] Japan .................................. 1-160742

[51] Int. Cl.⁵ ............................................. G11B 5/31
[52] U.S. Cl. ............................................ 360/126
[58] Field of Search ........................................ 360/126

[56] References Cited

U.S. PATENT DOCUMENTS 4,219,855  8/1980  Jones, Jr. .......................... 360/125
4,636,897  1/1987  Nakamura et al. ................. 360/126
4,769,729  9/1988  Kumasaka et al. ................. 360/126
4,814,921  3/1989  Hamakawa et al. ................ 360/126

Primary Examiner—Robert S. Tupper
Attorney, Agent, or Firm—Antonelli, Terry, Stout & Kraus

[57] ABSTRACT

A thin film magnetic head has a first magnetic core member carried by a substrate, a gap layer formed on the first magnetic core member, and a second magnetic core member formed in a spaced relation with the first magnetic core member. The second magnetic core member is coupled to the first magnetic core member to form a magnetic path and to have an end portion of the gap layer sandwiched by gap defining portions of the first and second magnetic core members. A coil conductor is wound about the magnetic path. In one embodiment, the first magnetic core member includes a first magnetic layer made of a magnetic material having stable magnetic properties during heat treatment and the second magnetic core member includes a second magnetic layer made of a material having a saturation flux density higher than that of the material of the first magnetic core member.

23 Claims, 6 Drawing Sheets

F I G. 4
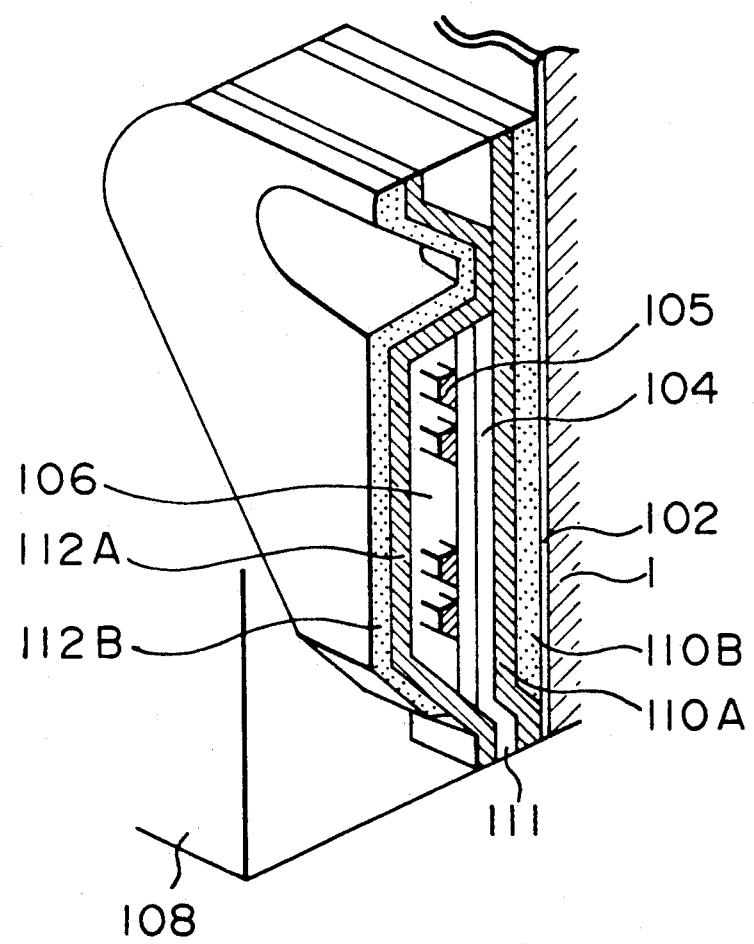

F I G. 7
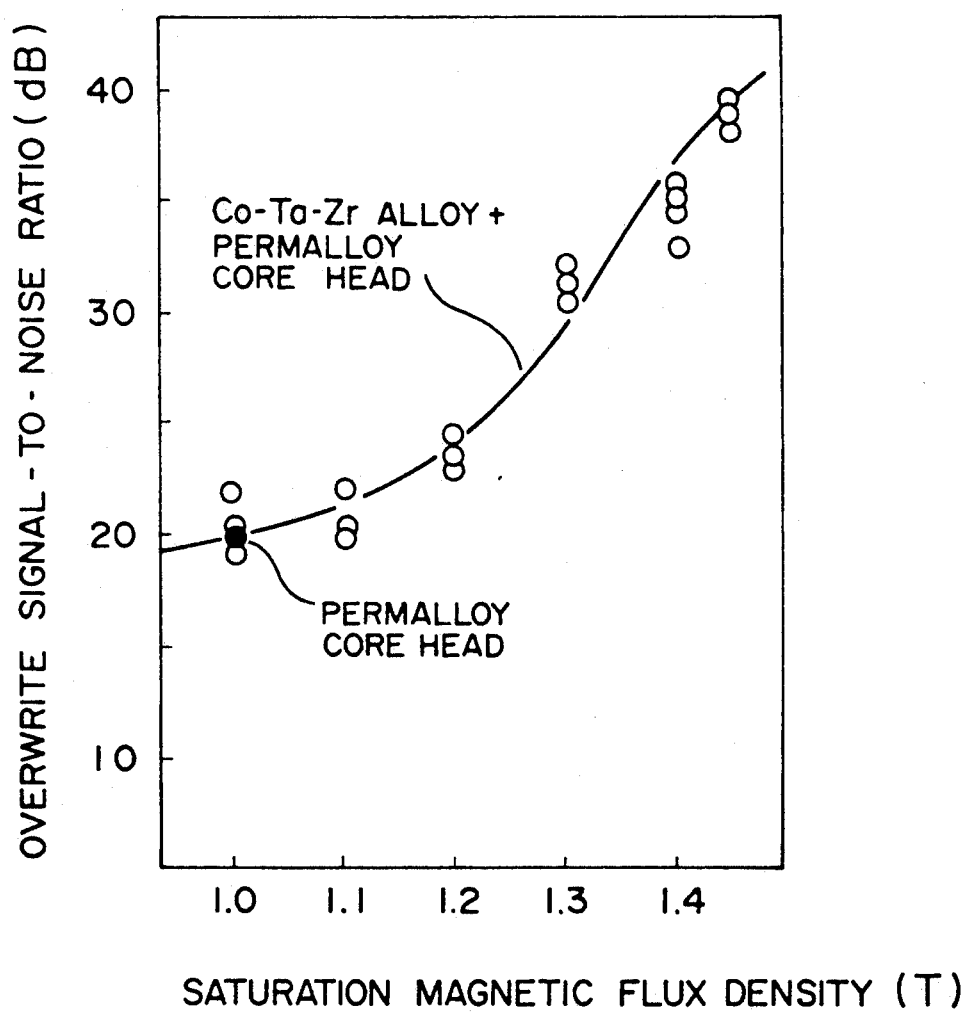

THIN FILM MAGNETIC HEAD HAVING AT LEAST ONE MAGNETIC CORE MEMBER MADE AT LEAST PARTLY OF A MATERIAL HAVING A HIGH SATURATION MAGNETIC FLUX DENSITY

BACKGROUND OF THE INVENTION

The present invention relates to a thin film magnetic head suitable for high-density magnetic recording.

In recent years, magnetic recording with higher density and higher performance has been developed remarkably. Especially in the field of a magnetic disc device for a large-sized computer, capacity has been increased as a result of a significant improvement in recording density. In magnetic disc devices, a thin-film magnetic head having a smaller inductance, a larger high-frequency permeability and a narrower track width as compared with conventional ferrite heads has been put into practical use. As described in JP-A-55-87323 (published on Jul. 2, 1980, and corresponding to U.S. application Ser. No. 972,102 filed on Dec. 21, 1978, now U.S. Pat. No. 4,219,855), thin film magnetic heads are conventionally fabricated by using Ni-Fe (permalloy) alloys each having a saturation magnetic flux density of 1 T.

FIG. 1 is a sectional view of a principal part of a thin film magnetic head formed by using a Ni-Fe alloy. With reference to FIG. 1, an $Al_2O_3$ film 12 is formed on an insulating substrate 1 comprising $Al_2O_3$-TiC ceramics, $Al_2O_3$-$TiO_2$ ceramics, SiC, Zn ferrite, Ni-Zn ferrite, Mn-Zn ferrite or the like by sputtering. A lower magnetic core member 2' is formed by sputtering a Ni-Fe alloy. The layer thickness is 1.5 μm. A non-magnetic gap 3 is formed by sputtering $Al_2O_3$. As an insulating layer 5 of a coil conductor 4, heat-resisting polyimide resin or a resist material is used. The coil conductor 4 is formed by sputtering Cu. In the same way as the lower magnetic core member 2', an upper magnetic core member 10 is formed by sputtering a Ni-Fe alloy. The film thickness is chosen to be 2.0 μm. The representative composition of the Ni-Fe alloy is 81 wt % Ni-19 wt % Fe, for which the magnetostriction becomes zero. Further, a protective layer 7 having a thickness substantially equivalent to 20 μm is formed on the above described magnetic core member 10. Patterning of the lower magnetic core member 2', the non-magnetic gap 3, the coil conductor 4 and the upper magnetic core member 10 is formed by using the ion milling method.

In order to improve the recording density, the coercive force of the medium must be raised. In order to cope with this, the thickness of the magnetic core member must be made large so that a large number of magnetic lines of force may emerge from the tip of the head core. If the thickness of the magnetic core member is made large, however, a resulting decrease in the reproduction resolution especially poses a problem, although it is a matter of course that the recording resolution is also decreased. It is said that a conventional head having a magnetic core comprising a Ni-Fe alloy having a saturation magnetic flux density 1 T cannot sufficiently cope with future problems of both a higher coercive force of the medium and a lower reproduction resolution caused by an increase in recording density and a magnetic material having a high saturation magnetic flux density must be used for a magnetic layer constituting a magnetic core member.

In recent years, an amorphous sputter layer has been developed as a magnetic layer having a high saturation magnetic flux density and a high performance (high permeability). Among the rest, an amorphous alloy comprising Zr and Hf as amorphous state establishing elements is especially excellent in corrosion resistance and wear resistance and has excellent properties for use as a magnetic layer for a magnetic head. More specifically, the amorphous alloy is represented by the composition formula MaTbAc, where M denotes at least one of Co, Fe, Ni and the like each having a magnetic moment and A denotes at least one of Zr, Hf and the like each having a large atomic radius. T denotes a transition metal other than M and A. Especially, a Co-Ta-Zr amorphous alloy, a Co-Ta-Hf amorphous alloy and a Co-Ta-Hf-Pd amorphous alloy as described in JP-A-58-98824 (published on Jun. 11, 1983) and JP-A-60-21504 (published on Feb. 2, 1985) are regarded as promising for use as the magnetic layer for a thin film magnetic head because a saturation magnetic flux density of 1.3 T is obtained at a magnetostriction of zero in each of them. As for a crystal alloy layer, a multilayer structure comprising an Fe-C alloy and a Ni-Fe alloy and a multilayer structure comprising an Fe-Si-Ru alloy and a Ni-Fe alloy have been developed as a high-performance magnetic layer having a high saturation magnetic flux density as described in JP-A-59-130408 (published on Jul. 27, 1984).

As another material of a magnetic layer having a high saturation magnetic flux density, a 45 wt % Ni-55 wt % Fe alloy is known. Since the 45 wt % Ni-55 wt % Fe alloy has a large positive magnetostriction, however, a variation in the reproduction output of a thin film head using it is large, resulting in a problem. Further, since the permeability is as small as 1,300 to 1,400, the reproduction output is also small as compared with a thin film magnetic head using 81 wt % Ni-19 wt % Fe (permalloy), resulting in another problem.

In JP-A-60-10410 (published on Jan. 19, 1985, and corresponding to U.S. application Ser. No. 508,207 filed on Jun. 27, 1983, now U.S. Pat. No. 4,589,042), this problem is coped with by using a 45 wt % Ni-55 wt % Fe alloy having a large saturation magnetic flux density only in the tip region of the magnetic core and a 81 wt % Ni-19 wt % Fe alloy having a high permeability and a small negative magnetostriction in other portions substantially defining the reproduction output.

As a material having a high saturation magnetic flux density, a Co-Zr amorphous alloy layer is known. The Co-Zr amorphous alloy has a large anisotropic magnetic field immediately after sputtering and has a permeability as small as 700 to 800. A thin film magnetic head using this alloy thus has a problem that the reproduction output is small.

In JP-A-58-68211 (published on Apr. 23, 1983), this problem is coped with by combining a Co-Fe-B amorphous layer having a high permeability and a Co-Zr amorphous layer having a high saturation magnetic flux density.

In view of the fact that the magnetic flux converges in the vicinity of the gap of the magnetic core, the above described JP-A-58-68211 copes with the above described problem by forming a magnetic core with two kinds of magnetic layers and making the saturation magnetic flux density of the magnetic layer in the vicinity of the gap larger.

SUMMARY OF THE INVENTION

However, every material having a high saturation magnetic flux density heretofore described is not completely stable thermally, but is quasi-stable and inferior in thermal stability to the Ni-Fe alloy conventionally used. For example, the above described Co-Ta-Zr amorphous alloy layer was used for an upper magnetic core member and a lower magnetic core member, and a thin film magnetic head having a structure similar to that of FIG. 1 was formed. As a result of heat treatment in the fabrication process of the thin film head, however, the magnetic characteristics of the Co-Ta-Zr amorphous magnetic layer of the lower magnetic core member deteriorated. A head having a lower reproduction efficiency as compared with the thin film magnetic head having the structure of FIG. 1 was obtained.

On the other hand, the material having a high saturation magnetic flux density is applied to only the tip of the magnetic core in case of the thin film magnetic head described in the aforementioned JP-A-60-10410. Therefore, the fabrication process of the thin film magnetic head comprises a large number of processing steps. In the case of JP-A-58-68211, the fabrication process is simple, but the magnetostriction of the Co-Zr amorphous alloy is positive and as large as $3 \times 10^{-6}$. It has been found that use of the Co-Zr amorphous alloy on the entire face of the magnetic core might cause variation in the reproduction output and distortion of the reproduction waveform, i.e., so-called wiggles.

In the case of JP-A-58-68211, the tip of the magnetic core, i.e., the recording medium engaging portion of the thin film magnetic head comprises a magnetic layer having a low saturation magnetic flux density. Therefore, as compared with a thin film magnetic head in which a material having a high saturation magnetic flux density is exposed on the entire face of the recording medium engaging portion, the thickness of the magnetic core must be made large, the achievement of a high recording density thus being hindered.

An object of the present invention is to provide a thin film magnetic head which is excellent in recording capability and/or reproduction efficiency.

Another object of the present invention is to provide a thin film magnetic head which has a simple in fabrication process and is excellent in recording capability and/or reproduction efficiency.

According to one aspect of the present invention, in a thin film magnetic head, a first magnetic core member (e.g., a lower magnetic core member) carried by a substrate includes a first magnetic layer made of a magnetic material having stable magnetic properties during heat treatment, while a second magnetic core member (e.g., an upper magnetic core member) for forming a magnetic path with the first magnetic core member includes a second magnetic layer made of a material having a saturation magnetic flux density higher than that of the material of the first magnetic layer.

Even if a material having a high saturation magnetic flux density which is quasi-stable during heat treatment is used to form a magnetic core of a head, the above described structure effectively suppresses deterioration of soft magnetic properties caused by heat treatment in the thin film head process and provides a thin film head which is excellent in reproduction efficiency. Further, by using a material having a high saturation magnetic flux density for the upper part, the recording capability is also improved as compared with the conventional head in which only permalloy is used to form the magnetic core.

According to another aspect of the present invention, in the thin film magnetic head as stated above, the first magnetic core member further includes a third magnetic layer formed between the first magnetic layer and an electrically insulating material for insulating a conductor coil wound about the magnetic core. The gap defining portion, i.e., the recording medium engaging portion, of the first magnetic core member is constituted by a portion of the third magnetic layer, and the gap defining portion of the second magnetic core member is constituted by a portion of the second magnetic layer of the second core member. Meanwhile, the second magnetic core member further includes a fourth magnetic layer formed on that surface of the second magnetic layer on which the electrically insulating material is provided, except the gap defining portion of the second magnetic layer. Each of the third and second magnetic layers is made of a magnetic material having a permeability substantially not lower than 700 and substantially not higher than 4000 and a magnetostriction having an absolute value substantially not larger than $0.5 \times 10^{-6}$.

Preferably, each of the third and second magnetic layers has a saturation magnetic flux density substantially not lower than 1.2 T and a coercive force substantially not higher than 1.0 Oe. Furthermore, each of the first and fourth magnetic layers is made of a magnetic material having a magnetorestriction having an absolute value substantially not higher than $0.5 \times 10^{-6}$.

Owing to the above described configuration, occurrence of wiggles is effectively suppressed. Since a magnetic core member is constituted by combining a material having a low permeability, a low magnetostriction and a high saturation magnetic flux density with another material having a high permeability, a low magnetostriction and a low saturation magnetic flux density, a thin film magnetic head which is excellent in writing capability and reproduction properties is obtained.

BRIEF DESCRIPTION OF THE DRAWINGS

FIG. 4 is a sectional view of an embodiment of a thin film magnetic head according to the present invention;

FIG. 7 shows the relationship between the saturation magnetic flux density and overwriting signal-to-noise ratio of a magnetic core of an embodiment of a thin film magnetic head according to the present invention.

DESCRIPTION OF THE PREFERRED EMBODIMENT

Figure 1:
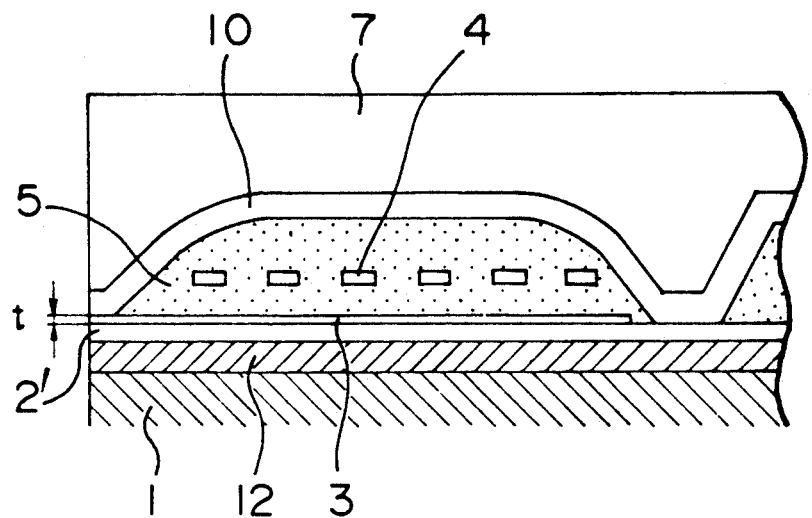
FIG. 1 is a sectional view of a principal part of a thin film magnetic head including magnetic core members formed by using only permalloy.
Figure 2A:
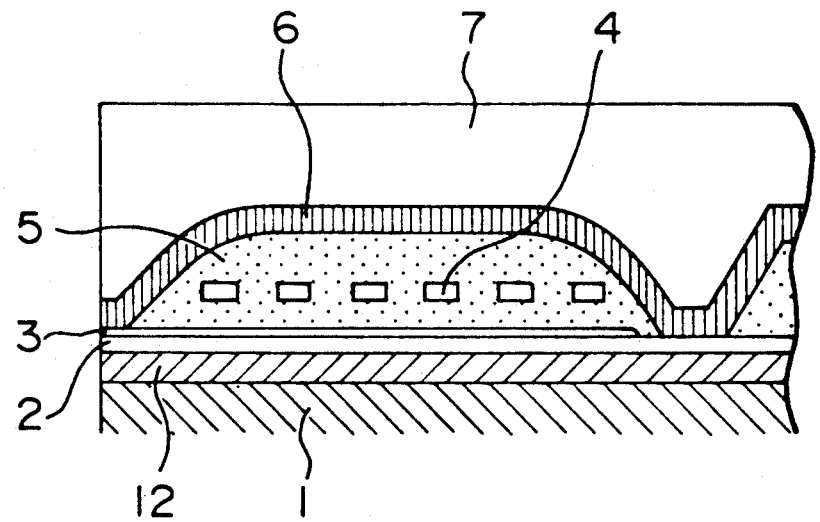
FIGS. 2A and 2B are respectively a sectional view and an oblique view of a principal part of an embodiment of a thin film magnetic head including magnetic core members formed by using a material having a high saturation magnetic flux density and permalloy according to the present invention.
Figure 2B:
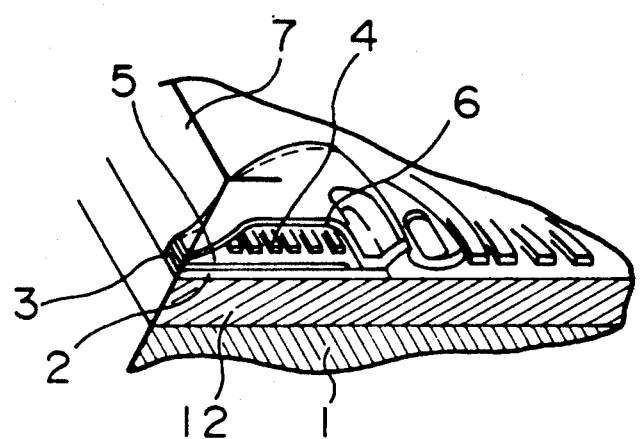

FIGS. 2A and 2B are a sectional view and an oblique view of an embodiment of a thin film magnetic head according to the present invention. With reference to FIG. 2A, an $Al_2O_3$ layer 12, for example, is formed by sputtering on an insulating substrate 1 comprising $Al_2O_3$-TiC ceramics, $Al_2O_3$-$TiO_2$ ceramics, SiC, Zn ferrite, Ni-Zn ferrite or Mn-Zn ferrite. A lower (first) magnetic core member has a magnetic layer 2 formed by sputtering a magnetic material having stable magnetic properties during heat treatment such as a Ni-Fe alloy on the insulating layer 12. This magnetic layer 2 has a saturation magnetic flux density of 1 T. In this embodiment, the magnetic layer 2 is 1.5 μm in thickness. A gap layer 3, which may be non-magnetic, is formed by sputtering $Al_2O_3$, for example, on the layer 2. An insulating layer 5 for a coil conductor 4 may comprise heat-resisting polyimide resin or a resist, for example. Further, the coil conductor 4 is formed by sputtering Cu, for example. An upper (second) magnetic core member has a magnetic layer 6 formed by sputtering a magnetic material having a saturation magnetic flux density larger than that of the lower magnetic core such as a $Co_{92}Ta_5Zr_3$ amorphous alloy having a saturation magnetic flux density of 1.3 T. The magnetic layer 6 is 2.0 μm in thickness. The head further comprises a protective layer 7 of $Al_2O_3$ having a thickness substantially equivalent to 20 μm.

With reference to the sectional view of FIG. 2A, the first and second magnetic core members (magnetic layers) 2 and 6 are magnetically coupled to each other at portions opposite to their gap defining portions, i.e., at portions opposite to their recording medium engaging portions, to form a magnetic path. Further, the gap defining portions of the layers 2 and 6 sandwich one end portion of the non-magnetic gap layer 3. Patterning of the lower magnetic layer 2, the non-magnetic gap layer 3, the insulating layer 5, the coil conductor 4 and the upper magnetic layer 6 can be performed by using the ion milling method, for example.

Since the $Co_{92}Ta_5Zr_3$ amorphous alloy sputter layer has a large anisotropic magnetic field in the state immediately after sputtering, it must be reduced by applying a magnet annealing treatment to the layer, i.e., applying a heat treatment to the layer in a magnetic field. The magnetic annealing treatment was performed after the $Al_2O_3$ protective layer had been formed. If heat-resisting polyimide resin is used as the insulating layer, the magnetic annealing treatment can be applied with a high temperature. First of all, a magnetic field of 8 kOe was applied in the track width direction of the magnetic core (which is the direction perpendicular to the paper in FIG. 2A coincides with the direction of the easy magnetization axis of the layer 6), and the magnetic annealing treatment was performed at 380° C. for one hour. Thereafter, a magnetic field of 8 kOe was applied in the gap depth direction of the magnetic core (which coincides with the direction of the hard magnetization axis of the layer 6), and the magnetic annealing treatment was performed at 350° C. for one hour. If a resist is used as the insulating layer 5, the temperature of magnetic annealing treatment must be made lower than the heat-resisting temperature of the resist. In this case, a magnetic field of 8 kOe was first applied parallel to the track width direction of the magnetic core, and the magnetic annealing treatment was performed at 250° C. for one hour. Thereafter, a magnetic field of 8 kOe was applied in the gap depth direction of the magnetic core, and the magnetic annealing treatment was performed at 230° C. for one hour.

As an example for comparison, a head having the same head structure and using the $Co_{92}Ta_5Zr_3$ amorphous alloy sputter layer for both the lower magnetic core member 2 and the upper magnetic core member 6 was also fabricated. In the fabrication of this head, the magnetic annealing treatment for reducing the anisotropic magnetic field was performed not only after the upper magnetic core member had been formed but also after the lower magnetic core member had been formed. At this time, a magnetic field of 8 kOe was first applied in the direction of the easy magnetization axis of the layer and the magnetic annealing treatment was performed at 380° C. for one hour. Thereafter, a magnetic field of 8 kOe was applied in the direction of the hard magnetization axis of the layer, and the magnetic annealing treatment was performed at 330° C. for one hour. Owing to this heat treatment, the anisotropic magnetic field of the $Co_{92}Ta_5Zr_3$ amorphous alloy sputter layer could be reduced from 16 Oe to substantially 5 Oe and the permeability could be raised from 700 to substantially 2,500. As a result of executing of the succeeding process, however, the anisotropic magnetic field was increased and the permeability was decreased. More specifically, if heat resisting polyimide resin is used as the material of the insulating layer 5, for example, the head assembly will undergo a heat treatment at substantially 350° C. for one hour for forming the insulating layer. Therefore, the anisotropic magnetic field increases to its original value substantially equal to 16 Oe and the permeability decreases to 700. Meanwhile, if a resist is used as the material of the insulating layer 5, the head assembly will undergo a heat treatment at substantially 275° C. for five hours for forming the insulating layer. Therefore, the anisotropic magnetic field augments to 10 Oe, and the permeability lowers to 1,200. In the head using a permalloy layer for the lower magnetic core, however, deterioration of the magnetic properties (i.e., increase of the anisotropic magnetic field and decrease of permeability) does not occur.

The reproduction output and overwrite properties of thin film heads fabricated as described above were evaluated by using a recording medium with $\gamma$-$Fe_2O_3$ having a coercive force of 400 Oe and a layer thickness of 0.4 μm under the condition that the spacing between the head and the recording medium was 0.25 μm. Table 1 shows recording and reproducing properties obtained by using the respective heads.

TABLE

| Material of magnetic core member of sample head | Overwrite signal-to-noise ratio | Relative reproduced output |
|---|---|---|
| Only permalloy | 25 dB | 100 |
| Only Co—Ta—Zr alloy | 37 dB | 70 |
| Permalloy (lower magnetic core member) + Co—Ta—Zr alloy (upper magnetic core member) Embodiment of the present invention | 35 dB | 100 |

In the thin film magnetic head of the present embodiment, a reproduction output substantially equivalent to that of the conventional permalloy head is obtained. In addition, the overwrite property has been improved as compared with the permalloy head by approximately 10 dB. For the head using only $Co_{92}Ta_5Zr_3$ amorphous magnetic core members, the overwrite property has been improved as compared with the permalloy head by approximately 12 dB. However, the reproduction output has been decreased to only approximately 70% of that of the permalloy head.

In a thin film magnetic head having an upper magnetic core member which was formed by using an amorphous alloy having a high saturation magnetic flux density such as a Co-Ta-Hf amorphous alloy and a Co-Ta-Hf-Pd amorphous alloy, similar results were obtained. Further, in case of an upper core member of an amorphous material which is quasi-stable during heat treatment such as an alternate lamination of Fe-Si-Ru alloy films and permalloy alloy films or an alternate lamination of Fe-C alloy films and permalloy alloy films, similar results were obtained.

Figure 3:
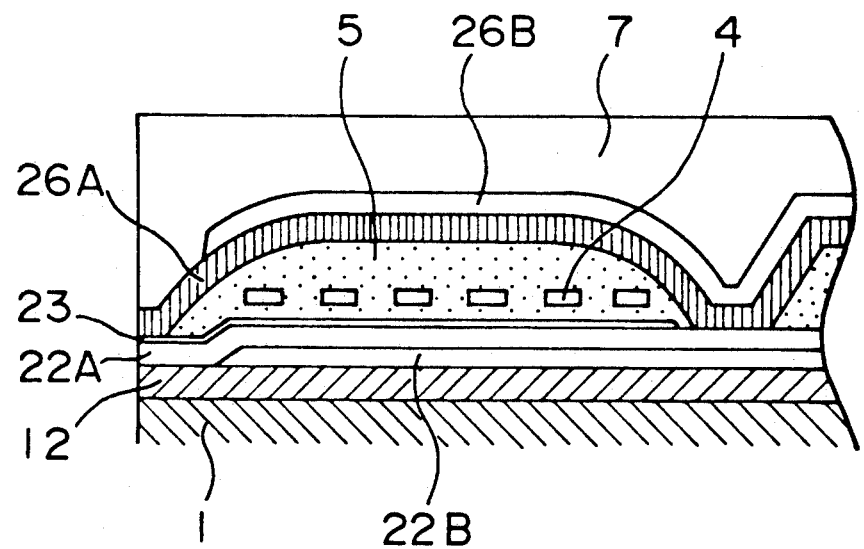
FIG. 3 is a sectional view of a principal part of an embodiment of a thin film magnetic head according to the present invention in which one of the magnetic core members is formed by using two layers, i.e., a magnetic layer comprising a material having a high saturation magnetic flux density and another magnetic layer comprising permalloy.

FIG. 3 shows the sectional view of another embodiment of a thin film magnetic head according to the present invention. With reference to FIG. 3, an $Al_2O_3$ layer 12, for example, is formed by sputtering on an insulating substrate 1 comprising $Al_2O_3$-TiC ceramics, $Al_2O_3$-$TiO_2$ ceramics, SiC, Zn ferrite, Ni-Zn ferrite, Mn-Zn ferrite or the like. The lower magnetic core member includes an outer magnetic layer 22B formed by sputtering a magnetic material having stable magnetic properties during heat treatment such as a Ni-Fe alloy on the layer 12 so as to have a layer thickness of, say, 1 μm and an inner magnetic layer 22A formed by similarly sputtering a Ni-Fe alloy on the layer 22B and on a part of the layer 12 so as to have a layer thickness of, say, 1.5 μm. A non-magnetic gap layer 23 is formed by sputtering $Al_2O_3$, for example, on the layer 22A. As the insulating layer 5 for the coil conductor 4, heat-resisting polyimide resin or a resist, for example, is used. Further, the coil conductor 4 is formed by sputtering Cu, for example. The upper magnetic core member includes an inner magnetic layer 26A formed by sputtering a magnetic material having a saturation magnetic flux density larger than that of the layers 22A and 22B such as a $Co_{92}Ta_5Zr_3$ amorphous alloy having a saturation magnetic flux density of 1.3 T on the layer 5 so as to have a layer thickness of 2.0 μm and an outer magnetic layer 26B formed by sputtering permalloy on the layer 26A so as to have a layer thickness of 1.0 μm. The head further comprises a protective layer 7 formed on the layer 26B and on a part of the layer 26A so as to have a thickness of approximately, say, 20 μm.

With reference to the sectional view of FIG. 3, the inner magnetic layer 22A of the lower magnetic core member and the inner magnetic layer 26A of the upper magnetic core member are magnetically coupled to each other at portions opposite to their recording medium engaging portions, i.e., opposite to their gap defining portions, to form a magnetic path. Further, the gap defining portions of the layers 22A and 26A sandwich one end portion of the non-magnetic gap layer 23. As illustrated, the outer magnetic layers 22B and 26B are not formed on the gap defining portions of the inner magnetic layers 22A and 26A.

Patterning of the magnetic layers 22B and 22A constituting the lower magnetic core member, the nonmagnetic gap layer 23, the coil conductor 4, the insulating layer 5, and the magnetic layers 26A and 26B constituting the upper magnetic core member may be executed by using the ion milling method, for example. Since the $Co_{92}Ta_5Zr_3$ amorphous alloy sputter layer has a large anisotropic magnetic field in the state immediately after sputtering, the magnetic annealing treatment must be applied to it in the same way as in the embodiment described before. Therefore, the magnetic annealing treatment was applied to it in the same way as in the embodiment described before. As a result of evaluating the recording and reproducing properties in the same way as in the embodiment described before, the overwrite property was substantially equivalent to that of the embodiment described before and the reproduction output was improved by 20%. It is considered that the reproduction output was improved because the volume of the magnetic core member increased and as a result the resistance of the magnetic path decreased.

FIG. 4 shows a sectional structure of another embodiment of a thin film magnetic head according to the present invention.

An $Al_2O_3$ layer 102 is formed by sputtering on an insulating layer 1 comprising $Al_2O_3$-TiC ceramics, $Al_2O_3$-$TiO_2$ ceramics, SiC, Zn ferrite, Ni-Zn ferrite, Mn-Zn ferrite or the like. A first magnetic core member includes an outer magnetic layer 110B having a saturation magnetic flux density of 1 T formed by sputtering a material having stable magnetic properties against during heat treatment such as a Ni-Fe alloy on the layer 102 and an inner magnetic layer 110A formed by sputtering a material having a larger saturation magnetic flux density than that of the layer 110B such as the $Co_{92}Ta_5Zr_3$ amorphous alloy on the layer 110B and a part of the layer 102.

Immediately after sputtering, the permeability of the $Co_{92}Ta_5Zr_3$ amorphous alloy sputter layer 110A (measured at 5 MHz) was 700 and its coercive force (in the direction of the hard magnetization axis) was 1.0 Oe. The permeability of the Ni-Fe alloy layer 110B (measured at 5 MHz) was 1,500. Further, the magnetostriction of the $Co_{92}Ta_5Zr_3$ amorphous alloy sputter layer 10A was $-1\times10^{-8}$, and the magnetostriction of the Ni-Fe alloy layer 110B was $-1\times10^{-7}$. The magnetostriction of the $Co_{92}Ta_5Zr_3$ amorphous alloy sputter layer changes by approximately $\pm2\times10^{-7}$ as a result of heat treatment executed in the process of head fabrication.

A gap layer 111, which may be non-magnetic, is then formed by sputtering $Al_2O_3$ on the layer 110A. A coil conductor 105 is formed by sputtering Cu, for example. As an insulating layer 106 for the coil conductor 105, heat-resisting polyimide resin or a resist, for example, is used.

A second magnetic core member includes an inner magnetic layer 112A formed by sputtering a material having a larger saturation magnetic flux density than that of the outer magnetic layer 110B of the first magnetic core member (such as the $Co_{92}Ta_5Zr_3$ amorphous alloy having a saturation magnetic flux density of 1.3 T) on the layer 106 and an outer magnetic layer 112B formed by sputtering Ni-Fe having a saturation magnetic flux density of 1 T, for example, on the layer 112A.

With reference to the sectional view of FIG. 4, the inner magnetic layer 110A of the first magnetic core member and the inner magnetic layer 112A of the second magnetic core member are magnetically coupled to each other at portions opposite to their recording medium engaging portions, i.e., opposite to their gap defining portions, to form a magnetic path. Further, the gap defining portions of the layers 110A and 112A sandwich one end portion of the non-magnetic gap layer 111. As illustrated, the outer magnetic layers 110B and 112B are not formed on the gap defining portions of the inner magnetic layers 110A and 112A.

Patterning of the magnetic layers 110B and 110A constituting the first magnetic core member, the non-magnetic gap layer 111, the coil conductor 105, the insulating layer 106, and the magnetic layers 112B and 112A constituting the second magnetic core member may be executed by using the ion milling method, for example. The head further comprises a protective layer 108 of $Al_2O_3$ having a thickness of approximately, say 20 μm formed on the layer 112B and a part of the layer 112A.

Immediately after sputtering, the permeability of the $Co_{92}Ta_5Zr_3$ amorphous alloy sputter layer 112A (measured at 5 MHz) was 700 and its coercive force (in the direction of the hard magnetization axis) was 1.0 Oe. The permeability of the Ni-Fe alloy layer and 112B (measured at 5 MHz) was 1,500. Further, the magnetostriction of the $Co_{92}Ta_5Zr_3$ amorphous alloy sputter layer and 112A was $-1 \times 10^{-8}$, and the magnetostriction of the Ni-Fe alloy layer and 112B was $-1 \times 10^{-7}$. The magnetostriction of the $Co_{92}Ta_5Zr_3$ amorphous alloy sputter layer 112A changes by approximately $\pm 2 \times 10^{-7}$ as a result of heat treatment executed in the process of head fabrication.

For the purpose of comparison, heads having the same structure as that of the above described head, a saturation magnetic flux density of the Co-Ta-Zr amorphous sputter layers 110A and 112A being fixed to 1.3 T by making the contents of Co substantially constant, and a magnetostriction of the layers 110A and 112A being changed by changing the composition ratio of Ta and Zr, were fabricated. Further, the Co-Ta-Zr amorphous alloy sputter layers 110A and 112A can be provided with a decreased anisotropic anisotropy magnetic field and an increased permeability by applying the magnetic annealing treatment (heat treatment) to them as described above. For the purpose of comparison, therefore, thin film magnetic heads having the same structure as that of the above described head and comprising magnetic core members having the permeability of the Co-Ta-Zr amorphous alloy sputter layers 110A and 112A changed by the magnetic annealing treatment were fabricated.

Further, for the purpose of comparison, thin film magnetic heads having a magnetostriction prevented from exceeding an absolute value of $2 \times 10^{-7}$ value by keeping the composition ratio of Ta and Zr in the Co-Ta-Zr amorphous alloy sputter layers 110A and 112A nearly constant and a saturation magnetic flux density of the first and second magnetic core members changed by changing the contents of Co were fabricated.

Figure 5:
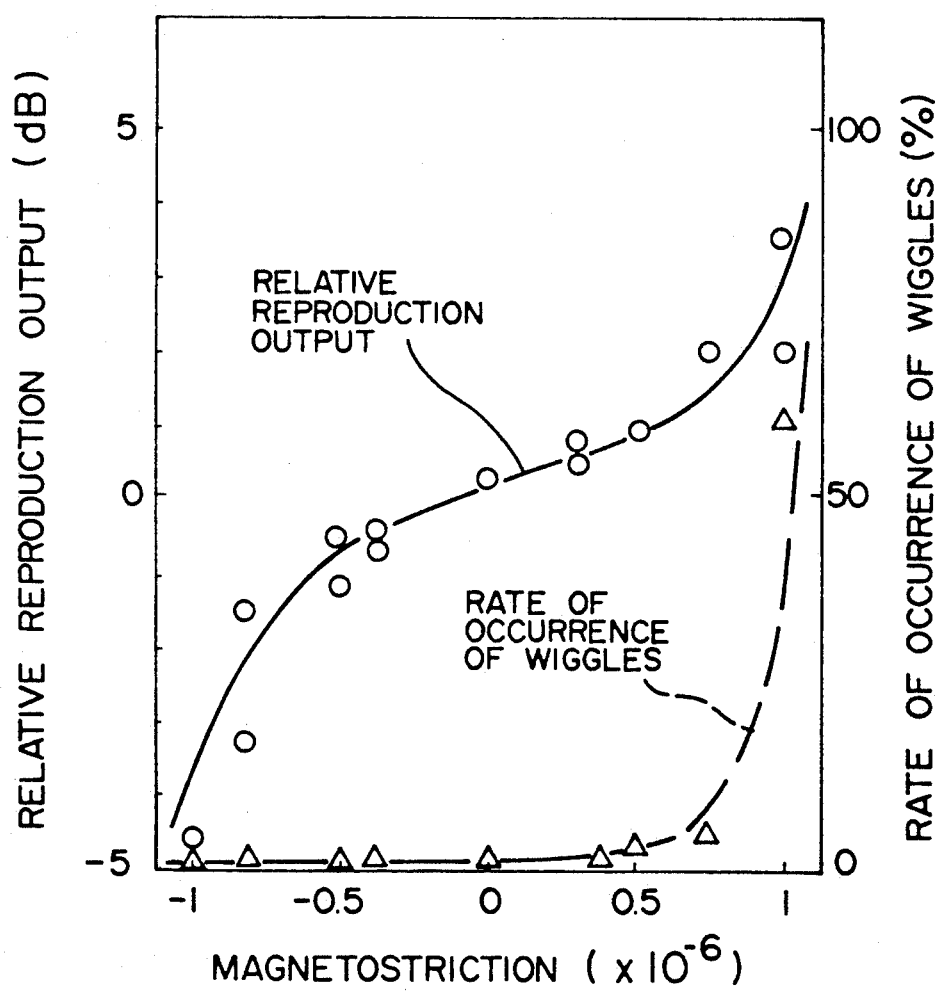
FIG. 5 shows the magnetostriction and reproduction properties of a magnetic core of an embodiment of a thin film magnetic head according to the present invention.

Reproduction properties and overwrite properties of the thin film heads fabricated as described above were evaluated by using a medium with $\gamma$-$Fe_2O_3$ having a coercive force of 400 Oe and a thickness of 0.4 μm applied thereto under the condition that spacing between the head and the recording medium was 0.25 μm. FIG. 5 shows the relationship between magnetostriction and reproduction properties (i.e., reproduction output and rate of occurrence of wiggles) of the Co-Ta-Zr amorphous alloy sputter layers 110A and 112A used in the magnetic core members.

The magnetostriction represents the magnetostriction obtained after the final step of the head fabrication process. The reproduction output represents the relative reproduction output as compared with the reproduction output of a thin film magnetic head having the same structure and using only permalloy in each of the outer and inner magnetic layers (four layers in total) of the first and second magnetic core members. On the other hand, the rate of occurrence of wiggles is represented by the ratio of the number of thin film magnetic heads in which wiggles have occurred to the total number 100 of thin film magnetic heads formed under the same condition and by taking % as unit.

With reference to FIG. 5, the reproduction output tends to increase as the positive magnetostriction increases. If the magnetostriction exceeds about $0.5 \times 10^{-6}$, the rate of occurrence of wiggles abruptly increases. In order to make the reproduction output substantially equivalent to that of a permalloy head and make the rate of occurrence of wiggles substantially not larger than 10%, it is desirable that the magnetostriction of the Co-Ta-Zr amorphous alloy sputter layer is substantially not lower than $-0.5 \times 10^{-6}$ and substantially not higher than $+0.5 \times 10^{-6}$.

Figure 6:
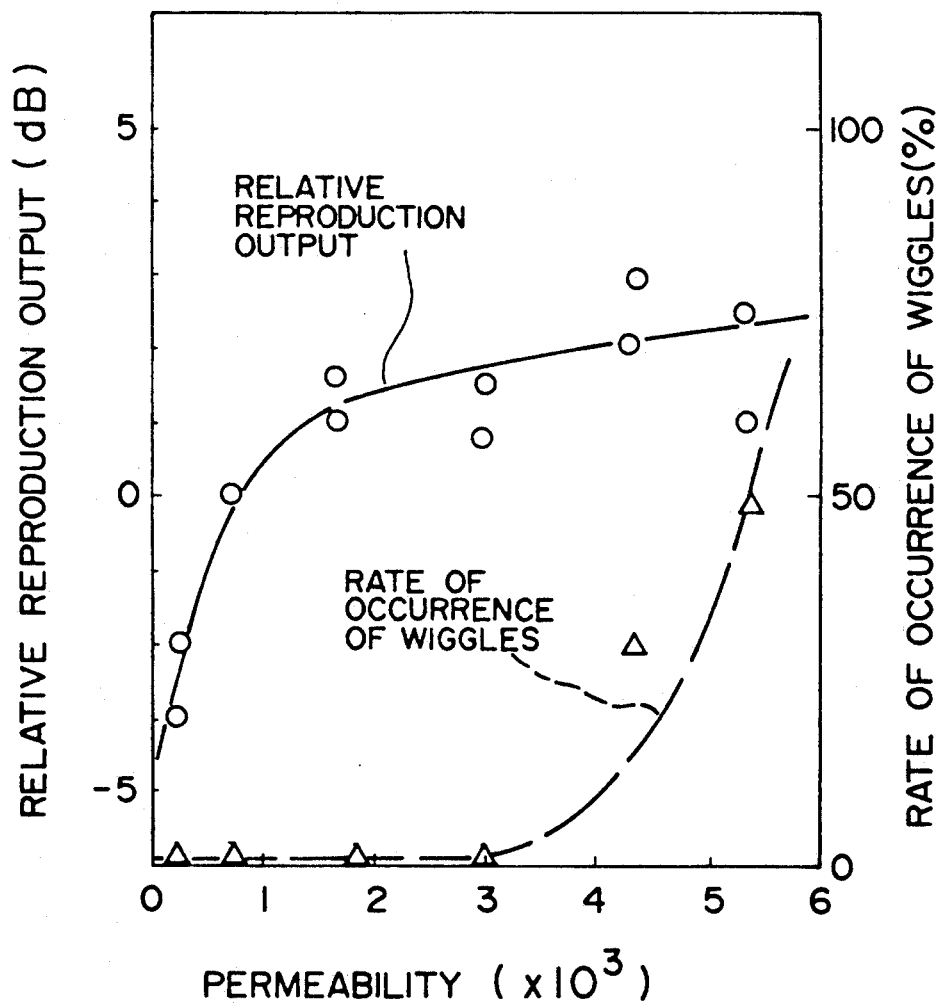
FIG. 6 shows the relationship between permeability and reproduction properties of a magnetic core of an embodiment of a thin film magnetic head according to the present invention.

FIG. 6 shows the change of reproduction properties (i.e., reproduction output and rate of occurrence of wiggles) caused when the magnetic annealing treatment is performed and the permeability of the magnetic core member is changed.

The reproduction output tends to increase as the permeability of the magnetic layers 110A and 112A increases. When the permeability exceeds about 4,000, however, the rate of occurrence of wiggles abruptly increases. If the permeability is substantially not less than 700, a reproduction output substantially equivalent to that of the permalloy head is obtained. When the measurement described above was performed with the magnetostriction of the permalloy layers 110B and 112B being changed in the range substantially from $-0.5 \times 10^{-6}$ to $+0.5 \times 10^{-6}$, the results did not change.

FIG. 7 shows the relationship between the saturation magnetic flux density of the Co-Ta-Zr amorphous alloy sputter layers 110A and 112A in the first and second magnetic core members and the overwrite signal-to-noise ratio of the head. The overwrite signal-to-noise ratio of a head using permalloy alone in the first and second magnetic core members was 20 dB. When the saturation magnetic flux density of the Co-Ta-Zr amorphous alloy sputter layer is 1.0-1.1 T, the overwrite signal-to-noise ratio was substantially equivalent to that of the head using permalloy alone. When the saturation magnetic flux density becomes not lower than 1.2 T, the effect of the increase in overwrite signal-to-noise ratio due to an increase in saturation magnetic flux density begins to become large and becomes significant when the saturation magnetic flux density becomes not lower than 1.3 T.

Similar results to those shown in FIGS. 5-7 were also obtained for a head fabricated by using an amorphous alloy having a saturation magnetic flux density such as a Co-Ta-Hf amorphous alloy or a Co-Ta-Hf-Pd amorphous alloy as the material of the inner magnetic layers 110A and 112A in the head structure shown in FIG. 4. Similar results were also obtained with head structures in which one or both of the inner magnetic layers 110A and 112A shown in FIG. 4 is constituted by an alternate lamination of Fe-Si-Ru alloy films and permalloy alloy films or is constituted by an alternate lamination of Fe-C alloy films and permalloy alloy films.

In the above described embodiment, the saturation magnetic flux density of the inner magnetic layers 110A and 112A may be substantially not lower than 1.2 T, and preferably substantially not lower than 1.3 T, and its coercive force may be substantially not higher than 1.0 Oe. Further, in the above described embodiment, the outer magnetic layers 110B and 112B may be substantially not higher than 1.0 T in saturation magnetic flux density, substantially not lower than 1,500 in permeability measured at 5 MHz, and in a range from $-0.5 \times 10^{-6}$ to $+0.5 \times 10^{-6}$ in magnetostriction. Further, the recording medium engaging portion of the thin film head may comprise only a magnetic layer having a high saturation magnetic flux density not lower than 1.2 T and preferably not lower than 1.3 T among magnetic layers constituting the magnetic core members.

Owing to such a structure, a thin film magnetic head which is free from wiggles and excellent in reproduction effect has been obtained. Further, by using a material having a high saturation magnetic flux density in the recording medium engaging portions of the first and second magnetic core members, the recording capability has been improved as compared with a conventional head using permalloy alone for the magnetic core members. In this head structure, the process is relatively simple because the magnetic core member is formed by sputtering a magnetic layer on the surface of the substrate.

We claim:

1. A thin film magnetic head comprising:
   a first magnetic core member supported by a substrate and having a gap defining portion;
   a gap layer formed on a portion of said first magnetic core member;
   a second magnetic core member formed in a spaced relation with said first magnetic core member and having a gap defining portion, said second magnetic core member being magnetically coupled to said first magnetic core member at a portion of said first magnetic core member on which said gap layer is not formed to form a magnetic path with said first magnetic core member, an end portion of said gap layer being sandwiched between said gap defining portions of said first and second magnetic core members;
   a coil conductor wound around said magnetic path; and
   electrically insulating material isolating said coil conductor, said first magnetic core member, and said second magnetic core member from one another except where said second magnetic core member is magnetically coupled to said first magnetic core member and where said gap layer is sandwiched between said gap defining portions of said first and second magnetic core members;
   wherein said first magnetic core member includes a first magnetic layer made of a magnetic material having stable magnetic properties during heat treatment, and said second magnetic core member includes a second magnetic layer formed on said electrically insulating material and a portion of said gap layer, and made of magnetic material having a saturation magnetic flux density higher than that of said magnetic material of said first magnetic layer, said gap defining portion of said second magnetic core member being constituted by a portion of said second magnetic layer, said second magnetic core member further including a third magnetic layer made of a magnetic material having stable magnetic properties during heat treatment and having a saturation magnetic flux density lower than that of said magnetic material of said second magnetic layer, said third magnetic layer being formed on said second magnetic layer except at said gap defining portion of said second magnetic core member.

2. A thin film magnetic head according to claim 1, in which said stable magnetic properties of said first magnetic layer of said first magnetic core member and said third magnetic layer of said second magnetic core member include permeability and an anisotropic magnetic field.

3. A thin film magnetic head according to claim 2, in which said magnetic material of said first magnetic layer of said first magnetic core member and said magnetic material of said third magnetic layer of said second magnetic core member are permalloy, and said magnetic material of said second magnetic layer of said second magnetic core member has a saturation magnetic flux density substantially not lower than 1.3 T.

4. A thin film magnetic head according to claim 3, in which said magnetic material of said second magnetic layer of said second magnetic core member is a Co-Ta-Zr amorphous alloy, a Co-Ta-Hf amorphous alloy, or a Co-Ta-Hf-Pd amorphous alloy.

5. A thin film magnetic head according to claim 3, in which said second magnetic layer of said second magnetic core member is constituted by a plurality of Fe-Si-Ru alloy films alternately laminated with a plurality of Ni-Fe alloy films, or by a plurality of Fe-C alloy films alternately laminated with a plurality of Ni-Fe alloy films.

6. A thin film magnetic head according to claim 1, in which said gap defining portion of said first magnetic core member is constituted by a portion of said first magnetic layer of said first magnetic core member, and said first magnetic core member further includes a fourth magnetic layer formed between said first magnetic layer and said substrate except at said gap defining portion of said first magnetic core member.

7. A thin film magnetic head according to claim 6 in which said first magnetic layer is made of permalloy, said second magnetic layer is made of a Co-Ta-Zr amorphous alloy, a Co-Ta-Hf amorphous alloy, or a Co-Ta-Hf-Pd amorphous alloy, and both of said third and fourth magnetic layers are made of permalloy.

8. A thin film magnetic head according to claim 1, in which said first magnetic core member further includes a fourth magnetic layer formed between said first magnetic layer and said gap layer, said gap defining portion of said first magnetic core member being constituted by a portion of said fourth magnetic layer, said first magnetic layer not being formed at said gap defining portion of said first magnetic core member.

9. A thin film magnetic head according to claim 8, in which each of said fourth magnetic layer and said second magnetic layer is made of a magnetic material having a permeability substantially not lower than 700 and substantially not higher than 4000 and a magnetostriction having an absolute value substantially not larger than $0.5 \times 10^{-6}$.

10. A thin film magnetic head according to claim 9, in which each of said first magnetic layer and said third magnetic layer is made of permalloy, and each of said fourth magnetic layer and said second magnetic layer is made of a Co-Ta-Zr amorphous alloy, a Co-Ta-Hf amorphous alloy, or a Co-Ta-Hf-Pd amorphous alloy.

11. A thin film magnetic head comprising:
a first magnetic core member supported by a substrate and having a gap defining portion;
a gap layer formed on a portion of said first magnetic core member;
a second magnetic core member formed in a spaced relation with said first magnetic core member and having a gap defining portion, said second magnetic core member being magnetically coupled to said first magnetic core member at a portion of said first magnetic core member on which said gap layer is not formed to form a magnetic path with said first magnetic core member, an end portion of said gap layer being sandwiched between said gap defining portions of said first and second magnetic core members;
a coil conductor wound around said magnetic path; and
electrically insulating material isolating said coil conductor, said first magnetic core member, and said second magnetic core member from one another except where said second magnetic core member is magnetically coupled to said first magnetic core member and where said gap layer is sandwiched between said gap defining portions of said first and second magnetic core members;
wherein said first magnetic core member includes a first magnetic layer, and said second magnetic core includes a second magnetic layer formed on said electrically insulating material and a portion of said gap layer, each of said first and second magnetic layers being made of a magnetic material having a permeability substantially not lower than 700 and substantially not higher than 4000 and a magnetostriction having an absolute value substantially not larger than $0.5 \times 10^{-6}$, said permeability and said magnetostriction substantially preventing occurrence of distortion in a reproduction waveform produced by said thin film magnetic head, said gap defining portions of said first and second magnetic core members being constituted by portions of said first and second magnetic layers of said first and second magnetic core members, respectively.

12. A thin film magnetic head according to claim 11, in which said magnetic material of said first and second magnetic layers has a saturation magnetic flux density substantially not lower than 1.2 T.

13. A thin film magnetic head according to claim 11, in which said first magnetic core member further includes a third magnetic layer formed between said substrate and said first magnetic layer except at said gap defining portion of said first magnetic core member, and said second magnetic core member further includes a fourth magnetic layer formed on said second magnetic layer except at said gap defining portion of said second magnetic core member, said first and second magnetic layers having saturation magnetic flux densities higher than those of said third and fourth magnetic layers, respectively.

14. A thin film magnetic head according to claim 13, in which each of said first and second magnetic layers is made of a Co-Ta-Zr amorphous alloy, a Co-Ta-Hf amorphous alloy, or a Co-Ta-Hf-Pd amorphous alloy, and each of said third and fourth magnetic layers is made of permalloy.

15. A thin film magnetic head according to claim 13, in which each of said first and second magnetic layers is constituted by a plurality of Fe-Si-Ri alloy films alternately laminated with a plurality of Ni-Fe alloy films, or by a plurality of Fe-C alloy films alternately laminated with a plurality of Ni-Fe alloy films, and each of said third and fourth magnetic layers is made of permalloy.

16. A thin film magnetic head comprising:
a first magnetic core member supported by a substrate and having a gap defining portion;
a gap layer formed on a portion of said first magnetic core member;
a second magnetic core member formed in a spaced relation with said first magnetic core member and having a gap defining portion, said second magnetic core member being magnetically coupled to said first magnetic core member at a portion of said first magnetic core member on which said gap layer is not formed to form a magnetic path with said first magnetic core member, an end portion of said gap layer being sandwiched between said gap defining portions of said first and second magnetic core members;
a coil conductor wound around said magnetic path; and
electrically insulating material isolating said coil conductor, said first magnetic core member, and said second magnetic core member from one another except where said second magnetic core member is magnetically coupled to said first magnetic core member and where said gap layer is sandwiched between said gap defining portions of said first and second magnetic core members;
wherein said first magnetic core member includes a first magnetic layer made of a magnetic material having stable magnetic properties during heat treatment, and said second magnetic core member includes a second magnetic layer formed on said electrically insulating material and a portion of said gap layer, and made of magnetic material having a saturation magnetic flux density higher than that of said magnetic material of said first magnetic layer;
wherein said stable magnetic properties of said first magnetic layer of said first magnetic core member include permeability and an anisotropic magnetic field;
wherein said magnetic material of said first magnetic layer of said first magnetic core member is permalloy, and said magnetic material of said second magnetic layer of said second magnetic core member has a saturation magnetic flux density substantially not lower than 1.2 T; and
wherein said second magnetic layer of said second magnetic core member is constituted by a plurality of Fe-Si-Ru alloy films alternately laminated with a plurality of Ni-Fe alloy films, or by a plurality of Fe-C alloy films alternately laminated with a plurality of Ni-Fe alloy films.

17. A thin film magnetic head comprising:
a first magnetic core member supported by a substrate and having a gap defining portion;
a gap layer formed on a portion of said first magnetic core member;
a second magnetic core member formed in a spaced relation with said first magnetic core member and having a gap defining portion, said second magnetic core member being magnetically coupled to said first magnetic core member at a portion of said first magnetic core member on which said gap layer is not formed to form a magnetic path with said first magnetic core member, an end portion of said gap layer being sandwiched between said gap defining portions of said first and second magnetic core members;

a coil conductor wound around said magnetic path; and electrically insulating material isolating said coil conductor, said first magnetic core member, and said second magnetic core member from one another except where said second magnetic core member is magnetically coupled to said first magnetic core member and where said gap layer is sandwiched between said gap defining portions of said first and second magnetic core members;

wherein said first magnetic core member includes a first magnetic layer made of a magnetic material having stable magnetic properties during heat treatment, and said second magnetic core member includes a second magnetic layer formed on said electrically insulating material and a portion of said gap layer, and made of magnetic material having a saturation magnetic flux density higher than that of said magnetic material of said first magnetic layer; and wherein said gap defining portions of said first and second magnetic core members are constituted by portions of said first and second magnetic layers of said first and second magnetic core members, respectively, said first magnetic core member further includes a third magnetic layer formed between said first magnetic layer and said substrate except at said gap defining portion of said first magnetic core member, and said second magnetic core member further includes a fourth magnetic layer formed on said second magnetic layer except at said gap defining portion of said second magnetic core member.

18. A thin film magnetic head comprising:

a first magnetic core member supported by a substrate and having a gap defining portion;

a gap layer formed on a portion of said first magnetic core member;

a second magnetic core member formed in a spaced relation with said first magnetic core member and having a gap defining portion, said second magnetic core member being magnetically coupled to said first magnetic core member at a portion of said first magnetic core member on which said gap layer is not formed to form a magnetic path with said first magnetic core member, an end portion of said gap layer being sandwiched between said gap defining portions of said first and second magnetic core members;

a coil conductor wound around said magnetic path; and electrically insulating material isolating said coil conductor, said first magnetic core member, and said second magnetic core member from one another except where said second magnetic core member is magnetically coupled to said first magnetic core member and where said gap layer is sandwiched between said gap defining portions of said first and second magnetic core members;

wherein said first magnetic core member includes a first magnetic layer made of a magnetic material having stable magnetic properties during heat treatment, and said second magnetic core member includes a second magnetic layer formed on said electrically insulating material and a portion of said gap layer, and made of magnetic material having a saturation magnetic flux density higher than that of said magnetic material of said first magnetic layer; and wherein said first magnetic core member further includes a third magnetic layer formed between said first magnetic layer and said gap layer, said gap defining portion of said first magnetic core member is constituted by a portion of said third magnetic layer, said first magnetic layer is not formed at said gap defining portion of said first magnetic core member, said gap defining portion of said second magnetic core member is constituted by a portion of said second magnetic layer, and said second magnetic core member further includes a fourth magnetic layer formed on said second magnetic layer except at said gap defining portion of said second magnetic core member.

19. A thin film magnetic head comprising:

a substrate;

a first magnetic core member supported by the substrate and having a gap defining portion;

a gap layer formed on a portion of the first magnetic core member;

a second magnetic core member formed in a spaced relation with the first magnetic core member and having a gap defining portion, said second magnetic core member being magnetically coupled to said first magnetic core member at a portion of the first magnetic core member on which the gap layer is not formed to form a magnetic path with the first magnetic core member, an end portion of said gap layer being sandwiched between the gap defining portions of the first and second magnetic core members;

a coil conductor wound around said magnetic path; and electrically insulating material isolating said coil conductor, the first magnetic member, and the second magnetic member from one another except where the second magnetic core member is magnetically coupled to the first magnetic core member and where the gap layer is sandwiched between the gap defining portions of the first and second magnetic core members;

wherein the first magnetic core member includes a first magnetic layer made of a magnetic material having stable magnetic properties during heat treatment, and the second magnetic core member includes a second magnetic layer formed at least on a portion of the gap layer in at least a portion of the gap defining portion of the second magnetic core member and made of a magnetic material having a saturation magnetic flux density higher than that of the magnetic material of the first magnetic layer, the second magnetic core member further including a third magnetic layer made of a magnetic material having stable magnetic properties during heat treatment and having a saturation magnetic flux density lower than that of the magnetic material of the second magnetic layer, the third magnetic layer being formed at least in a portion of the second magnetic core member other than the gap defining portion of the second magnetic core member.

20. A thin film magnetic head according to claim 19, in which the stable magnetic properties of the first magnetic layer of the first magnetic core member and the third magnetic layer of the second magnetic core member include permeability and an anisotropic magnetic field.

21. A thin film magnetic head according to claim 20, in which the magnetic material of the first magnetic layer of the first magnetic core member and the magnetic material of the third magnetic layer of the second magnetic core member are permalloy, and the magnetic material of the second magnetic layer of the second magnetic core member has a saturation magnetic flux density substantially not lower than 1.3 T.

22. A thin film magnetic head according to claim 21, in which the magnetic material of the second magnetic layer of the second magnetic core member is a Co-Ta-Zr amorphous alloy, a Co-Ta-Hf amorphous alloy, or a Co-Ta-Hf-Pd amorphous alloy.

23. A thin film magnetic head according to claim 21, in which the second magnetic layer of the second magnetic core member is constituted by a plurality of Fe-Si-Ru alloy films alternately laminated with a plurality of Ni-Fe alloy films, or by a plurality of Fe-C alloy films alternately laminated with a plurality of Ni-Fe alloy films.

* * * * *